United States Patent [19]

Shaffer

[11] 3,804,190

[45] Apr. 16, 1974

[54] AUXILIARY-POWERED WHEEL UNIT FOR DIRIGIBLE WHEEL APPLICATIONS

[75] Inventor: Walter M. Shaffer, Peoria, Ill.

[73] Assignee: Towmotor Corporation, Mentor, Ohio

[22] Filed: Oct. 10, 1972

[21] Appl. No.: 296,221

[52] U.S. Cl.............................. 180/44 F, 180/66 F
[51] Int. Cl.............................................. B60K 7/00
[58] Field of Search........... 180/6.2, 43 R, 44 F, 66, 180/82 R, 43 A; 192/13

[56] References Cited
UNITED STATES PATENTS

| | | | |
|---|---|---|---|
| 3,272,279 | 9/1966 | Budzich | 180/44 M |
| 1,316,918 | 9/1919 | Nogrady | 180/43 A |
| 2,887,201 | 5/1959 | Willis | 180/44 R |
| 2,818,699 | 1/1958 | Clemson | 180/6.2 X |

Primary Examiner—David Schonberg
Assistant Examiner—Terrance L. Siemens
Attorney, Agent, or Firm—Fryer, Tjensvold, Phillips & Lempio

[57] ABSTRACT

By employing a housing having fittings adapted to be pivotally connected to an axle with a king pin and a spindle on the opposite side, a wheel having a drum with an internal ring gear can be journalled on the spindle and the wheel on the rotor can be driven by a pinion gear keyed to a stub shaft extending through the housing above the spindle so the pinion meshes with the ring gear, reduction gearing clutched to the stub shaft and driven by a motor mounted in the housing above the reduction gearing provides a drive which forms a narrow compact wheel drive unit that can be manufactured at an economical cost.

4 Claims, 5 Drawing Figures

Fig_2.

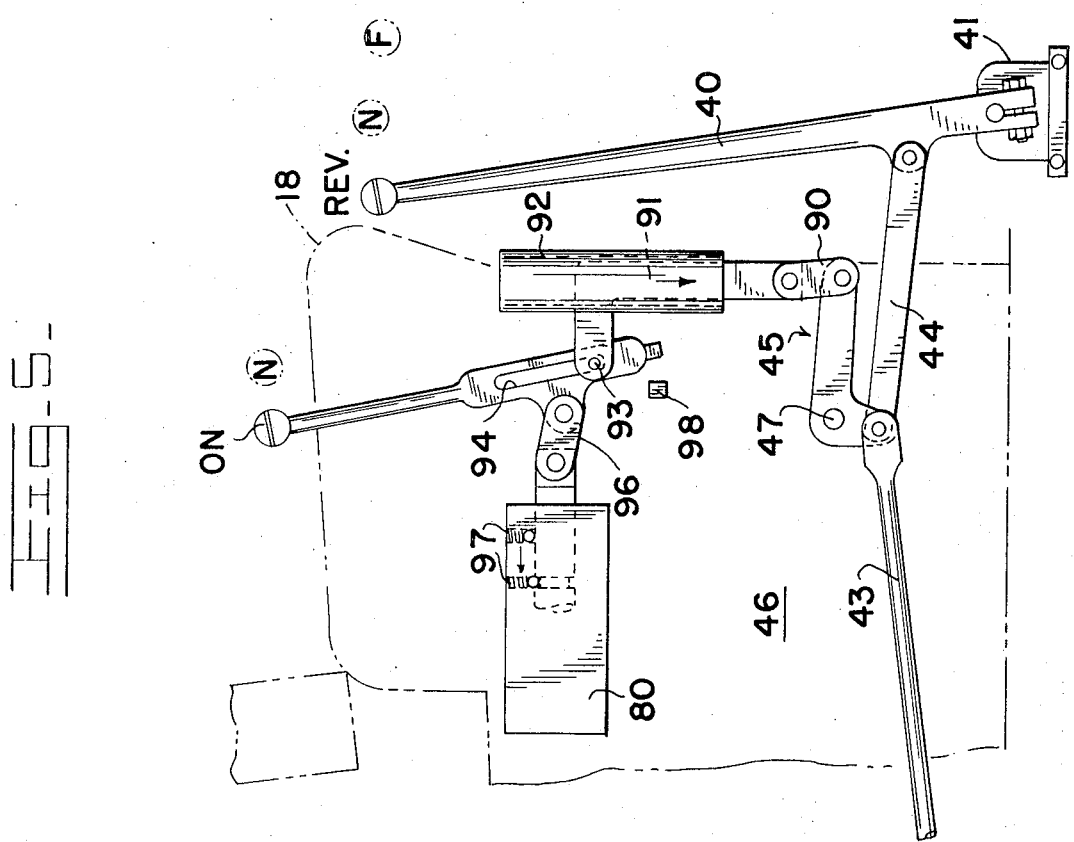
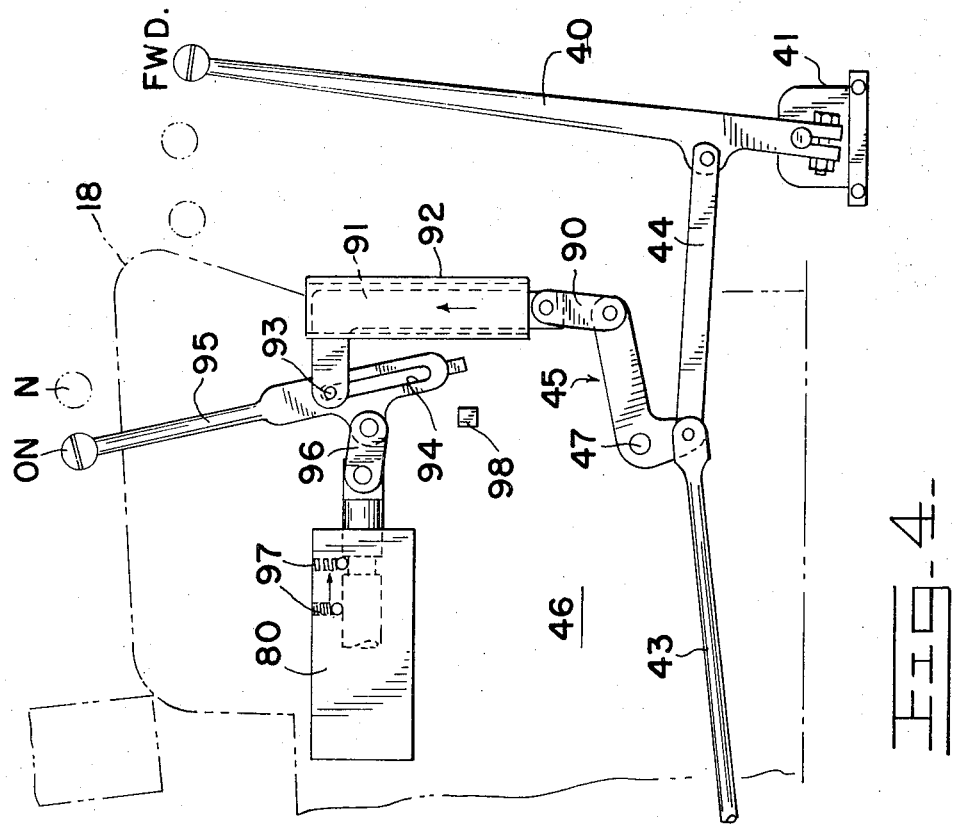

3,804,190

AUXILIARY-POWERED WHEEL UNIT FOR DIRIGIBLE WHEEL APPLICATIONS

BACKGROUND OF THE INVENTION

It has become a common practice to replace the dirigible wheels of vehicles, such as tractors and the like, with electrically or hydraulically powered dirigible wheel units because of the relative ease with which such units can be installed in such vehicles. Further, since special transmissions, differentials and gear trains are not required, a four wheel drive capability obtained by this replacement can be accomplished relatively economically in lower speed vehicles.

Some examples of powered dirigible wheel units are illustrated in U.S. Pat. No. 3,255,840 issued to Tangen, U.S. Pat. No. 3,272,276 issued to Budzich, U.S. Pat. No. 3,469,648 issued to Cannon, U.S. Pat. No. 3,458,005 issued to Malm et al and U.S. Pat. No. 3,186,506 issued to Leach et al.

In general, the powered dirigible wheel units referred to above tend to be complex and costly to fabricate. Further they often tend to be so bulky that special axles and attaching arrangements are required to mount them on a conventional vehicle. Also, in many cases their bulky configuration will place limitations on the cramp or steering angle of the vehicle on which they are incorporated.

Thus it is an object of this invention to provide a compact economical powered dirigible wheel unit which can be installed on vehicles needing limited four wheel drive capability without the disadvantages noted above.

SUMMARY OF THE INVENTION

A compact auxiliary powered wheel unit designed to accomplish the above objects includes a relatively flat housing having a hinging connection on one side for swingably connecting it to an axle and a spindle on the opposite side, a wheel rotor journalled on the spindle having an attached drum with an internal ring gear adjacent to the housing, a pinion gear keyed to a stub shaft journalled in the housing above the spindle so the pinion meshes with the ring gear, a reduction gear mounted on and clutched to stub shaft and a motor mounted on the housing above the reduction gear and drivingly engaging the reduction gear whereby motive power is transmitted to a wheel mounted on the rotor when a clutch couples the reduction gear to the stub shaft.

BRIEF DESCRIPTION OF THE DRAWINGS

The invention will be better understood by reference to the drawings wherein:

FIGS. 4 and 5 illustrate the simple mechanical control linkage in forward and reverse conditions for controlling direction of the auxiliary drive system in conjunction with the transmission drive direction of the conventional drive train of the lift truck illustrated in FIG. 2.

DESCRIPTION OF AN EMBODIMENT

Figure 1:
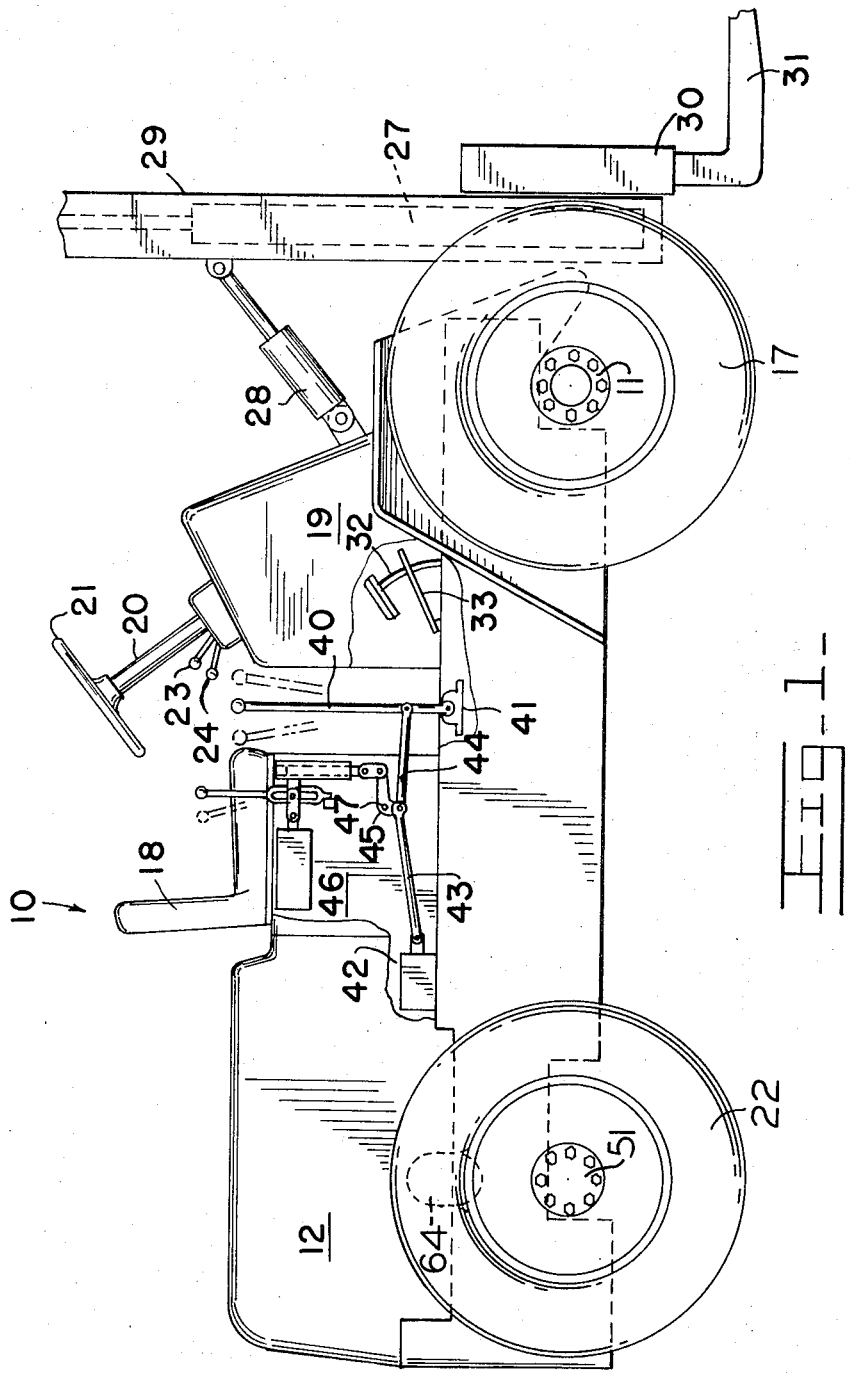
FIG. 1 is an elevation of a four wheel lift truck with the auxiliary drive features incorporated therein.
Figure 2:
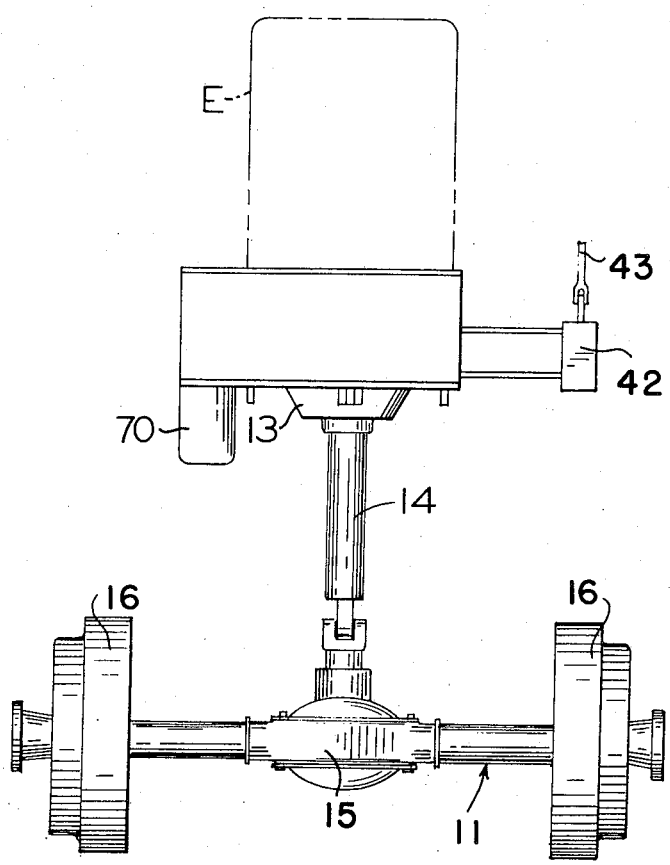
FIG. 2 is a plan of the conventional drive train in the lift truck illustrated in FIG. 1 with the engine indicated with broken lines.

In FIG. 1 a lift truck 10 is illustrated which uses a conventional front wheel drive system best shown in FIG. 2. An engine E (indicated by broken lines in FIG. 2) is mounted over the rear axle 51, under hood 12, with the engine output shaft connected in a bell housing of a hydrostatic transmission 13 to drive the input of the transmission. The output of the hydrostatic transmission is connected to the front axle by a torque tube 14 through a differential 15. At the outboard ends of the axle, final drive assemblies 16 are attached to provide the reduction gearing through which front wheels 17 are driven. A suitable hydrostatic transmission for this type of lift truck is illustrated in U. S. Pat. No. 3,486,335 issued to Kern et al. Such a transmission offers a selection of nearly infinite speed ratios between its input and output within the speed range of the transmission and therefore is a preferred drive train in lift trucks because of this feature.

Centrally located on the lift truck is an operator's seat 18 with an adjacent steering wheel 21 and steering column 20 mounted in a pedestal 19 located forward of the seat through which the rear dirigible wheels 22 of the lift truck are maneuvered to steer the lift truck.

On the pedestal 19 a lift control lever 23 connected to a lift control valve 25 is mounted, along with a tilt control lever 24 which is connected to a tilt control valve 26. These valves when actuated respectively operate the mast cylinders 27 and the tilt cylinders 28 for controlling a mast 29 and a carriage 30 with forks 31 that are reciprocated vertically on the mast structure in a conventional manner when the lift and tilt levers are operated.

Adjacent to the base of the pedestal are the brake pedal 32 and the engine accelerator pedal 33 providing the engine controls for the movement of the vehicle.

On the frame of the lift truck between the pedestal and seat is a transmission control lever 40 that is pivoted on a bracket 41 attached to the frame. Fore and aft movements of this lever will position the spool of transmission valve 42 through rod linkages 43 and 44 having their contiguous ends commonly connected to one end of a bellcrank 45 mounted on pivot pin 47 on seat support structure 46. The transmission lever, shown in a neutral position in FIG. 1, can be advanced forwardly to select a forward vehicle speed and rearwardly to select a reverse speed by positioning the spool of the transmission valve 42 for the appropriate speed. Bellcrank 45 forms part of the special mechanical control system for the rear wheel auxiliary drive system which will be discussed subsequently.

By providing drive motors (illustrated in FIG. 3) on dirigible wheels 22, a four wheel drive capability is obtained. In the instant invention, specially designed wheel drive units 49 are provided which can be swingably mounted at the ends of the rear axle 51 by a king pin 52 so a spindle 53 will support an associated rear wheel rotor 22a on wheel bearings 54 and 55. Above the spaced ears of each drive unit, pivotally pinned to the ends of the rear axle with the king pin, a stub shaft 56 is journalled in the housing 50 on bearings 57 with a pinion gear 58 keyed to its outboard end and a spline formed on its opposite end. With the rotor 22a of the associated wheel journalled on the spindle and connected to a drum 60, which encircles a portion of the housing of the wheel unit, an internal ring gear 59 in the drum meshes with the pinion and drives the rotor through power supplied to the stub shaft. A seal 61 between the drum and the housing prevents the ingress of dirt into the reduction gear drive formed by the pinion and the ring gear.

Figure 3:
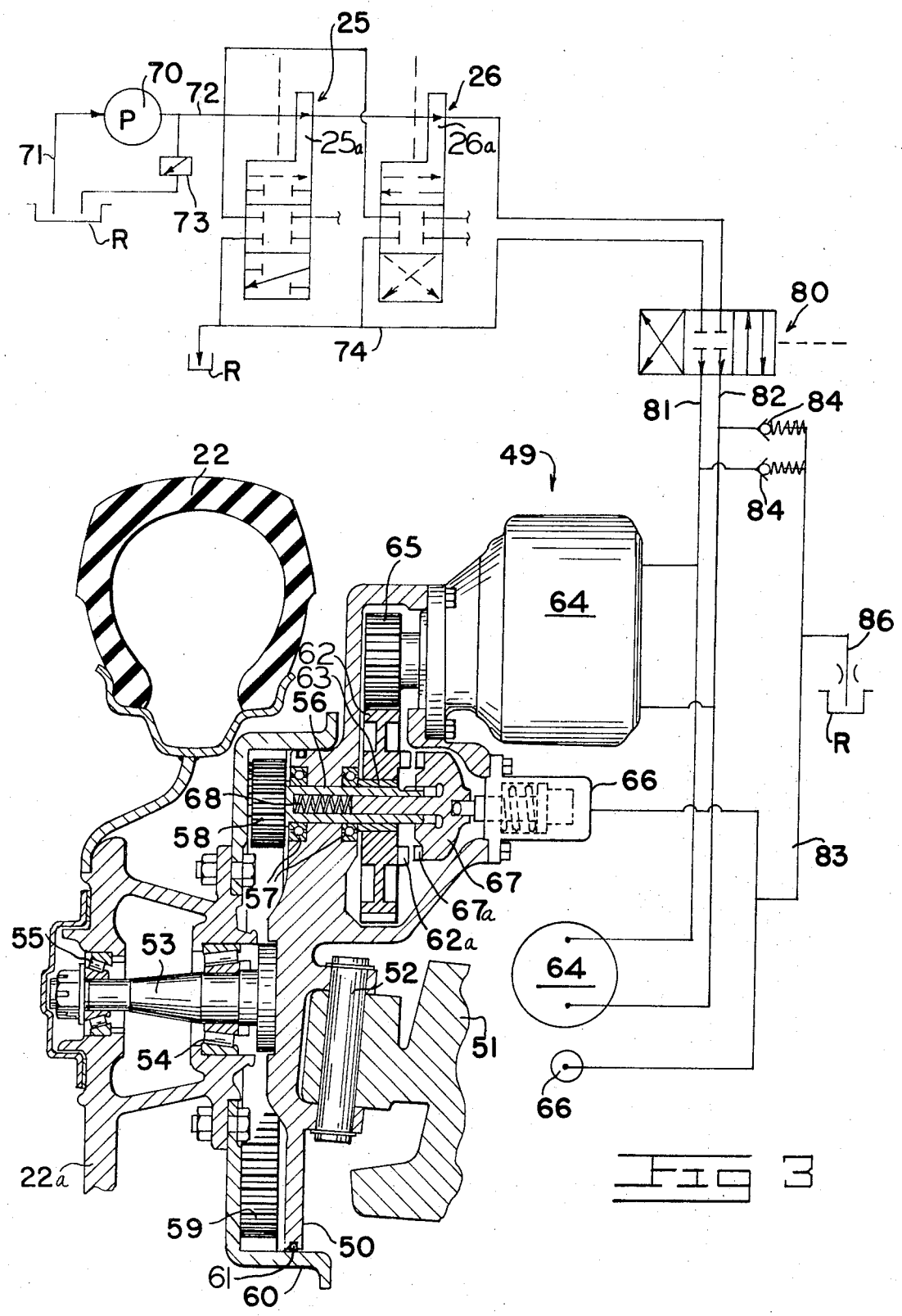
FIG. 3 is a section of a hydrostatic wheel drive unit, with parts broken away, used to replace the normal dirigible wheels of the lift truck illustrated in FIG. 1 to provide a four wheel drive capability.

A reduction gear 62 is mounted on stub shaft 56 to free-wheel on its bearing 63 within the housing 50 and meshes with a drive pinion 65 connected to the output shaft of a hydraulic motor 64 mounted on the upper portion of the housing so its drive pinion can be inserted through an aperture therein, as can be seen in FIG. 3. The hydrostatic motor can be selected from commercially available, positive displacement hydraulic motor units with internal reduction gearing. Since these units can be driven in both directions by reversing the flow of hydraulic fluid supplied to them from a pressurized source, directional control can be obtained by valving the hydraulic fluid used to power them.

As can be seen in FIG. 3, the gear train is arranged so the hydraulic motor 64 is mounted well above king pin attachment and does not require a bulky housing. This arrangement limits interference with the axle 51 and adjacent parts of the vehicle during steering operations. As a result, steering is not impaired by the unit when it is installed on the lift truck.

Since reduction gear 62 is mounted to free-wheel on the stub shaft 56 and is driven by the hydraulic motor 64, it must be physically connected to the stub shaft to drive wheel 22 through the latter's rotor and drum. To accomplish the necessary connection, a simple toothed clutch disc 67 is telescopically mounted on the splined end of the stub shaft with a mating internal spline and so its mandrel end is received in a blind counterbore in the stub shaft which contains spring 68. Cooperating teeth 62a are formed on the adjacent face of the reduction gear 62 and when the teeth 67a of the clutch disc are moved into engagement therewith, compressing spring 68, a drive train between the hydraulic motor and the wheel is established. This simple gear arrangement and clutch connection takes a minimum amount of space and can be built economically.

A spring loaded cylinder 66 has a plunger which engages the outboard end of the clutch disc 67, mounted on the housing 50 so its plunger can move the teeth of the clutch disc and reduction gear into engagement when it is pressurized by hydraulic fluid. When the cylinder is depressurized the spring 68 disengages the clutch. Since both wheel units are similar only one has been described in detail in the above description.

In the schematic of the hydraulic circuitry illustrated in FIG. 3, the engine driven pump 70 for the lift and tilt circuits is connected to a hydraulic reservoir R through intake 71 and supplies hydraulic fluid under pressure to the lift valve 25 and the tilt valve 26 via supply line 72. A relief valve 73 controls the maximum pressure in the circuit, and drain line 74 also connected to these valves forms a return to reservoir for exhaust hydraulic fluid.

Both valves 25 and 26 have a secondary control spool 25a and 26a respectively (schematically illustrated) through which a branch of supply line 72 is serially connected to directional valve 80 of the auxiliary drive. When either the lift or tilt valves is operated the supply of pressurized fluid to directional and control valve 80 is interrupted and therefore the lift and tilt circuits have priority on the output of pump 70. The directional and control valve is also connected to reservoir through line 74 to return exhaust hydraulic fluid.

Directional and control valve 80 is commonly connected to the hydraulic motors 64 on wheel units 49 with parallel circuitry formed by lines 81 and 82. Thus when the spool of the directional valve is shifted one of these lines will be pressurized by pump 70 and the other will return exhaust fluid from the motor 64 to the reservoir. A separate clutch line 83 is commonly connected to the two clutch hydraulic cylinders 66 and also to lines 81 and 82 through one-way check valves 84. As a result of this connection, if either line 81 or 82 is pressurized the two clutches will be automatically engaged. A small orifice 86 connects clutch line 83 to reservoir so that the clutches will release if neither of lines 81 or 82 is pressurized.

The above hydraulic circuitry arrangement provides the priority control for the output of pump 70 and the direction control of the auxiliary drive, i.e., coordination with the direction of the main drive train is automatically obtained by a special mechanical linkage. This mechanical linkage is best shown in FIGS. 4 and 5 and bellcrank 45 forms a part thereof, as previously indicated. As can be seen in the drawings, transmission control lever 40 is linked to one end of the bellcrank and will change the position of the other end which is connected by a clevis 90 to a fulcrum arm 91 which is reciprocally mounted in a vertical slide tube 92 so its position will be controlled by the position of the bellcrank. With the transmission lever in neutral the fulcrum pin 93 of the arm is in axial alignment with the cylindrical axis of the valve spool of valve 80 and located in a slot 94 of the auxiliary drive control lever 95. The drive lever has a clevis 96 connecting it to the spool in valve 80 and all the joints and the fulcrum pin are all in alignment with the cylindrical axis of the spool in the neutral transmission position, illustrated in FIG. 1. As a result, rearward movement of the auxliary speed control lever will not operate the directional valve 80 of the auxiliary drive.

If the transmission lever is placed in the forward mode, the fulcrum pin is moved upwardly and out of alignment with the spool of valve 80 (See FIG. 4). In such a situation rearward movement of the auxiliary speed control lever will move the spool of this direction control valve for forward auxiliary drive. However, if the transmission control lever 40 has been in the reverse position (see FIG. 5) the fulcrum pin would have been lowered below the aligned position and the directional valve would have been shifted in the opposite direction giving reverse auxiliary drive. It should be noted that if the tranmission control lever is shifted from forward to reverse during an auxiliary drive condition the auxiliary drive circuits would be neutralized as the fulcrum pin would pass through the "aligned position" returning lever 95 to neutral (N). Spring loaded ball arrangements 97 cooperate with a groove in the spool of valve 80 to hold the auxiliary drive in the "on" position when set with lever 95. A stop 98 prevents this lever from being pushed forward of the neutral position and the same rearward movement of this control lever gives auxiliary drive for the forward and reverse modes.

The aforedescribed linkage automatically sets the auxiliary drive system for forward or reverse drive, depending on the direction of operation of the main drive train and automatically neutralizes the auxiliary drive when the main drive train is neutralized.

What is claimed is:

1. An auxiliary powered wheel unit adapted for use as a dirigible wheel of a vehicle comprising:
   a housing having pivot connection on one face thereof and a spindle on its opposite face;
   a rotor journalled on said spindle with bearing means, said rotor having an attached drum with an internal ring gear located adjacent to said housing;
   a pinion gear keyed to a stub shaft journalled in said housing above said spindle so said stub shaft extends through said housing and said pinion gear meshes with said internal ring gear to form a first gear reduction driving said drum;
   a reduction gear mounted to free wheel on said stub shaft on the opposite side of said housing to said pinion, said reduction gear located above said pivot connection;
   clutch means coupled to said stub shaft and operable to connect said stub shaft and said reduction gear; and
   a motor means mounted on said housing above said stub shaft operably connected to drive said reduction gear to form a second gear reduction driving said first gear reduction whereby a wheel mounted on said rotor will be driven by said motor means when the clutch means connects the stub shaft and the reduction gear.

2. The auxiliary powered wheel unit defined in claim 1 wherein the clutch means includes a hydraulic actuator to couple the stub shaft and the reduction gear and a spring biased in said clutch means to release them.

3. The auxiliary powered wheel unit defined in claim 2 wherein the clutch means includes a toothed clutch disc coupled to the stub shaft and the reduction gear has cooperating teeth on an adjacent face thereof whereby the actuator can move the respective teeth into engagement to couple said stub shaft and said reduction gear.

4. The auxiliary powered drive unit defined in claim 1 wherein the motor means includes a reversible hydraulic motor drivingly connected to the reduction gear.

* * * * *